United States Patent
Ogawa

(10) Patent No.: US 7,627,229 B2
(45) Date of Patent: Dec. 1, 2009

(54) MOVING IMAGE RECORDING APPARATUS AND METHOD OF RECORDING MOVING IMAGE

(75) Inventor: Hideaki Ogawa, Saitama (JP)

(73) Assignee: Fujifilm Corporation, Tokyo (JP)

(*) Notice: Subject to any disclaimer, the term of this patent is extended or adjusted under 35 U.S.C. 154(b) by 1219 days.

(21) Appl. No.: 10/625,603

(22) Filed: Jul. 24, 2003

(65) Prior Publication Data

US 2004/0146276 A1     Jul. 29, 2004

(30) Foreign Application Priority Data

Jul. 26, 2002   (JP)  ............................... 2002-218677

(51) Int. Cl.
*H04N 7/00*     (2006.01)
(52) U.S. Cl. ....................................................... 386/95
(58) Field of Classification Search .................. 386/95, 386/124–125; 348/220.1, 231, 345–352
See application file for complete search history.

(56) References Cited

U.S. PATENT DOCUMENTS

| 5,914,787 | A | * | 6/1999 | Satoh et al. | .................. 358/402 |
| 6,038,636 | A | * | 3/2000 | Brown et al. | .................. 711/103 |
| 6,359,649 | B1 | * | 3/2002 | Suzuki | ..................... 348/220.1 |
| 6,845,438 | B1 | * | 1/2005 | Tanaka et al. | ................ 711/206 |
| 2002/0196717 | A1 | * | 12/2002 | Masui et al. | .............. 369/44.29 |

\* cited by examiner

*Primary Examiner*—Thai Tran
*Assistant Examiner*—Tat Chio
(74) *Attorney, Agent, or Firm*—Birch, Stewart, Kolasch & Birch, LLP.

(57) ABSTRACT

A recording medium controller detects the type of the record format of a recording medium, and sends detection signals to a CPU. The CPU judges whether the record format is suitable for high-speed recording or not. In a case of a general-purpose record format, the CPU detects the presence or absence of existing data in the recording medium. When the existing data is present, whole existing data is stored from the recording medium into an evacuated data area of an internal memory. Upon completing the evacuation of existing data, the recording medium controller reformats the recording medium. Then, moving image data is recorded on the reformatted recording medium. Upon completing the record of whole moving image data, existing data is reconstructed in the recording medium.

28 Claims, 4 Drawing Sheets

MOVING IMAGE RECORDING APPARATUS AND METHOD OF RECORDING MOVING IMAGE

BACKGROUND OF THE INVENTION

1. Field of the Invention

The present invention relates to a moving image recording apparatus which records photographed moving image data on a recording medium, and a method of recording moving image.

2. Background Arts

Image data photographed by a digital camera is generally recorded on a recording medium such as Smart Media (trademark) and the like. The recording medium is widely used in other electronic equipment such as a personal computer (PC) than the digital camera. Accordingly, in addition to the digital camera, electronic equipment such as a PC can format the recording medium. Formatting the recording medium indicates to divide the recording area into partitions called clusters, for the purpose of efficiently reading and writing data. The PC formats the recording medium with cluster size different from the digital camera. More specifically, the digital camera formats the recording medium with a large cluster size, due to placing prime importance on the recording speed rather than recording data capacity. Thus, the digital camera can record image data at a high speed, regardless of inefficiency in recording. The PC, on the other hand, formats the recording medium with a general-purpose cluster size which places prime importance on disk space efficiency, rather than the recording speed.

When a digital camera records a moving image in the recording medium formatted by the PC, there is a problem that photography stops in the middle because of insufficient writing speed to the recording medium. The problem often occurs in photographing the moving image such as a full movie, since the digital camera has to record large size data per second.

SUMMARY OF THE INVENTION

An object of the present invention is to provide a moving image recording apparatus which can photograph a moving image without stopping in the middle, when a recording medium formatted with a record format unsuitable for recording the moving image is loaded.

Another object of the present invention is to provide a moving image recording apparatus which can protect existing data recorded on a recording medium in recording a moving image.

To achieve the above objects, a moving image recording apparatus according to the present invention comprises a judgment device for judging whether a record format of a recording medium is suitable for the record of moving image data or not, and a recording medium controller for controlling the operation of the recording medium. When the judgment device judges that the record format is unsuitable for the record of moving image data, the recording medium controller reformats the recording medium with a high-speed record format which is suitable for the record of moving image data.

When the record format is unsuitable for the record of moving image data, the recording medium controller may detect the presence or absence of existing data in the recording medium. The moving image recording apparatus further comprises an internal memory and an internal memory controller. The internal memory controller temporarily evacuates existing data to the internal memory. After the reformat of the recording medium, the recording medium controller reconstructs the evacuated existing data in the recording medium.

According to the present invention, the type of record format of the recording medium is automatically detected, before or during the photography of a moving image. If necessary, the recording medium is reformatted with the high-speed record format which is suitable for the record of moving image data. Therefore, the photography of the moving image smoothly goes on without stopping, even if a user starts the photography by loading the PC-formatted or unformatted recording medium into a digital camera, by mistake.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
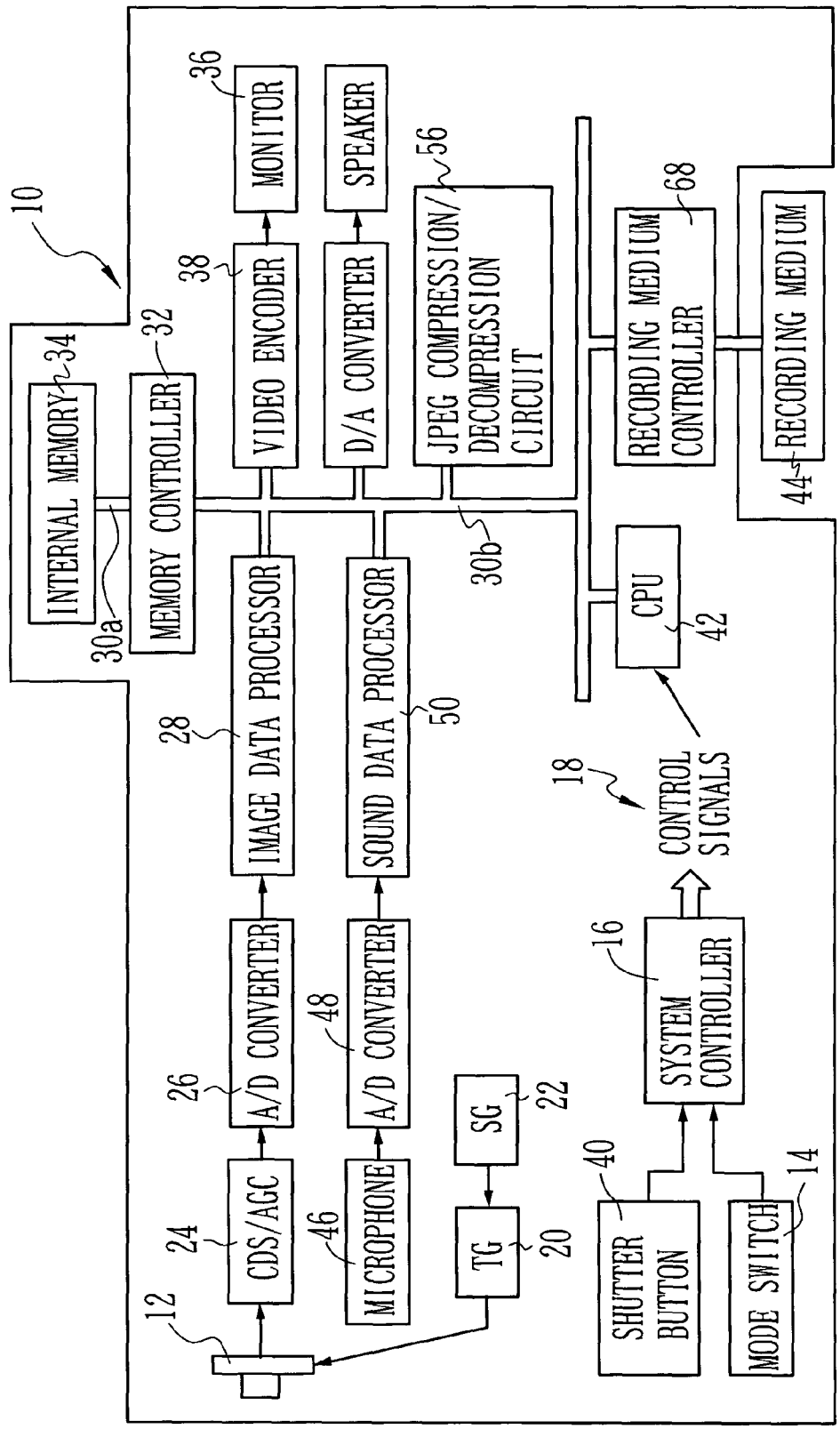
FIG. 1 is a block diagram of a digital camera which is equipped with a moving image recording apparatus.

Referring to FIG. 1, a digital camera 10 is provided with a CCD imager 12 of progressive scan type. Subject light, passing through a color filter disposed in front of the CCD imager 12, enters the CCD imager 12. A timing generator (TG) 20 generates timing signals on the basis of signals outputted from a signal generator (SG) 22. In synchronous to the timing signals, the CCD imager 12 is driven to output camera signals of one picture frame every one-fifteenth second. The outputted camera signals are subject to a noise reduction process and a level adjustment process in a CDS/AGC circuit 24. Then, an A/D converter 26 converts the camera signals into digital image data. In an image data processor 28, image data outputted from the A/D converter 26 is subject to luminance and color-difference (YUV) conversion to generate YUV data. YUV data of one picture frame is generated every one-fifteenth second.

YUV data is sequentially sent to a memory controller 32 via a data bus 30b. Since a monitor 36 adopts an interlace scan system, different from the progressive scan system of the CCD imager 12, the memory controller 32 temporarily stores YUV data on an internal memory 34, and then reads it out in the manner of the interlace scan system. YUV data in an interlaced scan form is sent to a video encoder 38 via a data bus 30b. The video encoder 38 generates NTSC-format composite image signals from YUV data. By outputting the composite image signals to the monitor 36, a moving image composed of fifteen picture frames per second is continuously displayed on the monitor 36.

When a shutter button 40 is operated, a system controller 16 generates control signals 18. In response to the control signals 18, a CPU 42 performs an imaging process and a recording process. In the imaging process, moving image data including image data and sound data is sequentially stored in the internal memory 34. In the recording process, moving image data obtained in the imaging process is recorded on a recording medium 44. The CPU 42 is equipped with a multitasking OS like µiTRON, so that the imaging process and the recording process are carried out at the same time.

Figure 2:
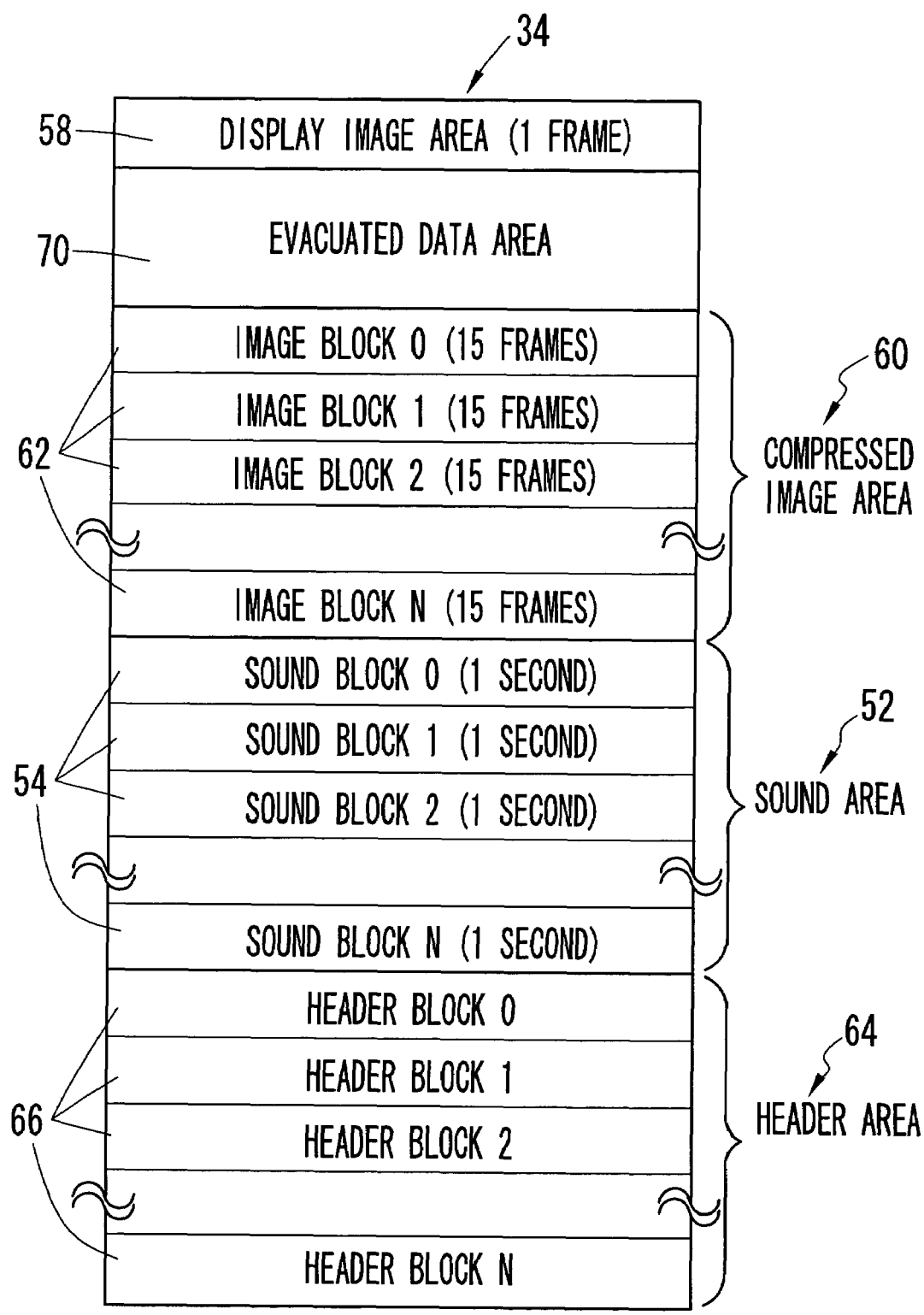
FIG. 2 is an explanatory view showing an example of data formation of an internal memory installed in the moving image recording apparatus.

Embodiments of the imaging process and recording process will be hereinafter described in detail. In the imaging process, the CPU 42 activates a microphone 46, an A/D converter 48, and a sound data processor 50 in response to the control signals 18. Sound data, inputted through the microphone 46 and the A/D converter 48, is subject to predetermined processes such as a noise elimination process in the sound data processor 50. Processed sound data is sent to the memory controller 32 via the data bus 30*b*. The memory controller 32 writes sound data into a sound area 52 (referring to FIG. 2) of the internal memory 34. The sound area 52 has plural sound blocks 54 each of which stores sound data of one second. Sound data of one second from the memory controller 32 is stored in each sound block 54.

YUV data stored on a display image area 58 (referring to FIG. 2) of the internal memory 34 is updated every one-fifteenth second because the display image area 58 has a capacity of only one picture frame. In response to compression signals from the CPU 42, the memory controller 32 reads YUV data at intervals of one-fifteenth second, and sends it to a JPEG compression/decompression circuit 56 to compress YUV data in JPEG format. Compressed image data is written into a compressed image area 60 of the internal memory 34 via the memory controller 32. The compressed image area 60 has plural image blocks 62 each of which stores compressed image data of fifteen picture frames.

Whenever sound data of one second and compressed image data of fifteen picture frames is written into the internal memory 34, as described above, sound header data and image header data is created, respectively. Sound header data and image header data is stored on header blocks 66 of a header area 64 via the memory controller 32.

Figure 3:
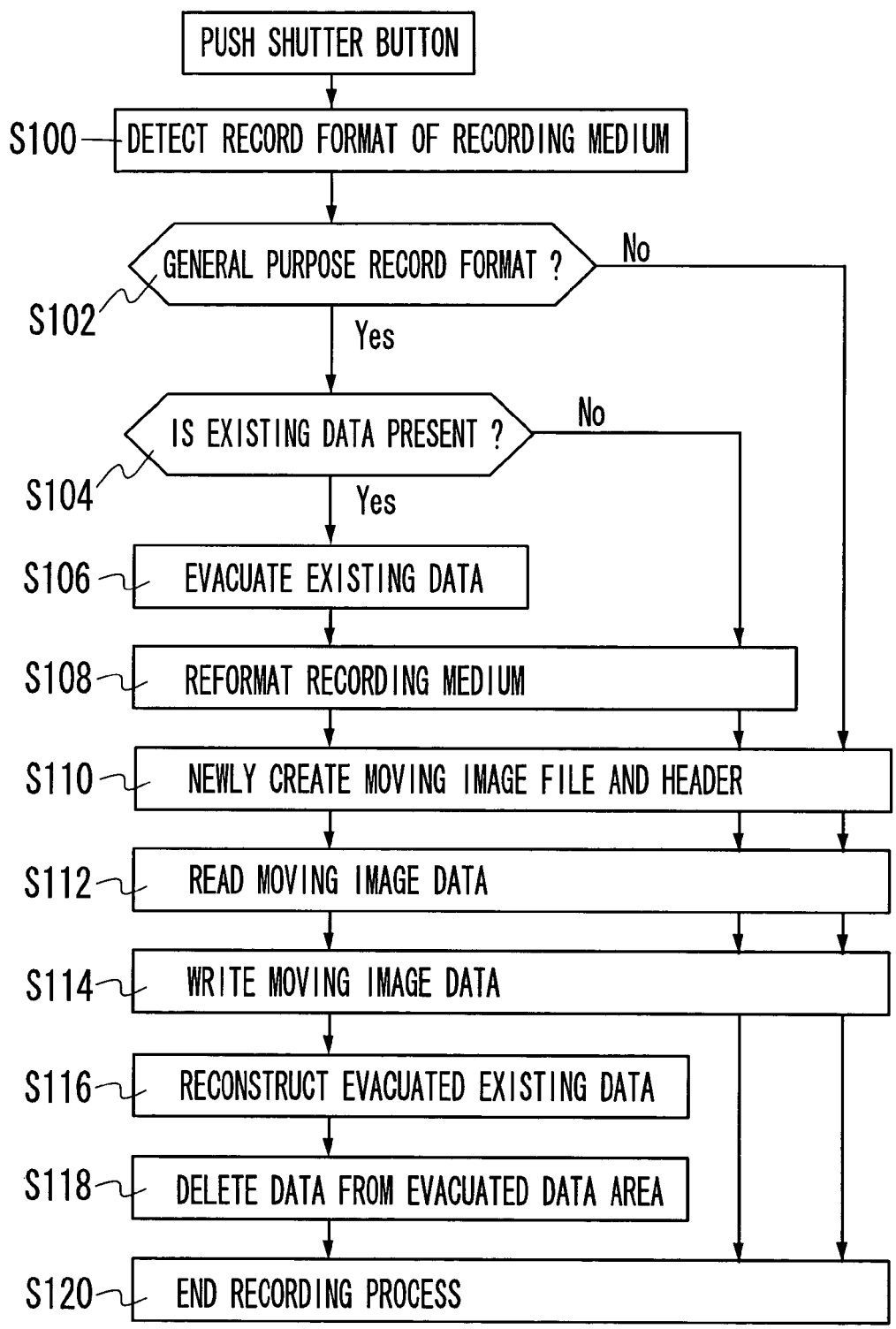
FIG. 3 is a flow chart showing the moving image recording process.

The embodiment of the recording process will be hereinafter described. FIG. 3 shows a flow of the recording process. Upon depressing the shutter button 40, the system controller 16 outputs control signals 18. Then, the CPU 42 commands a recording medium controller 68 to detect the type of record format of the recording medium 44. The recording medium controller 68 detects the record format of the recording medium 44 in a step S100, and sends detection signals to the CPU 42. In a step S102, the CPU 42 judges the type of record format of the recording medium 44, either a general-purpose record format for a PC and the like or a high-speed record format for the digital camera.

In a case of the general-purpose record format, the CPU 42 detects in a step 104 whether there is any existing data recorded on the recording medium 44 or not. If existing data is found in the recording medium 44, the CPU 42 commands the memory controller 32 and the recording medium controller 68 to evacuate whole existing data. The recording medium controller 68 reads whole existing data from the recording medium 44, and the memory controller 32 writes it into an evacuated data area 70 of the internal memory 34. Upon completing the evacuation of existing data, the recording medium controller 68 reformats the recording medium 44 with the high-speed record format, suitable for the high-speed recording, in a step S108. Whole data recorded on the recording medium 44 is deleted during formatting.

Figure 4:
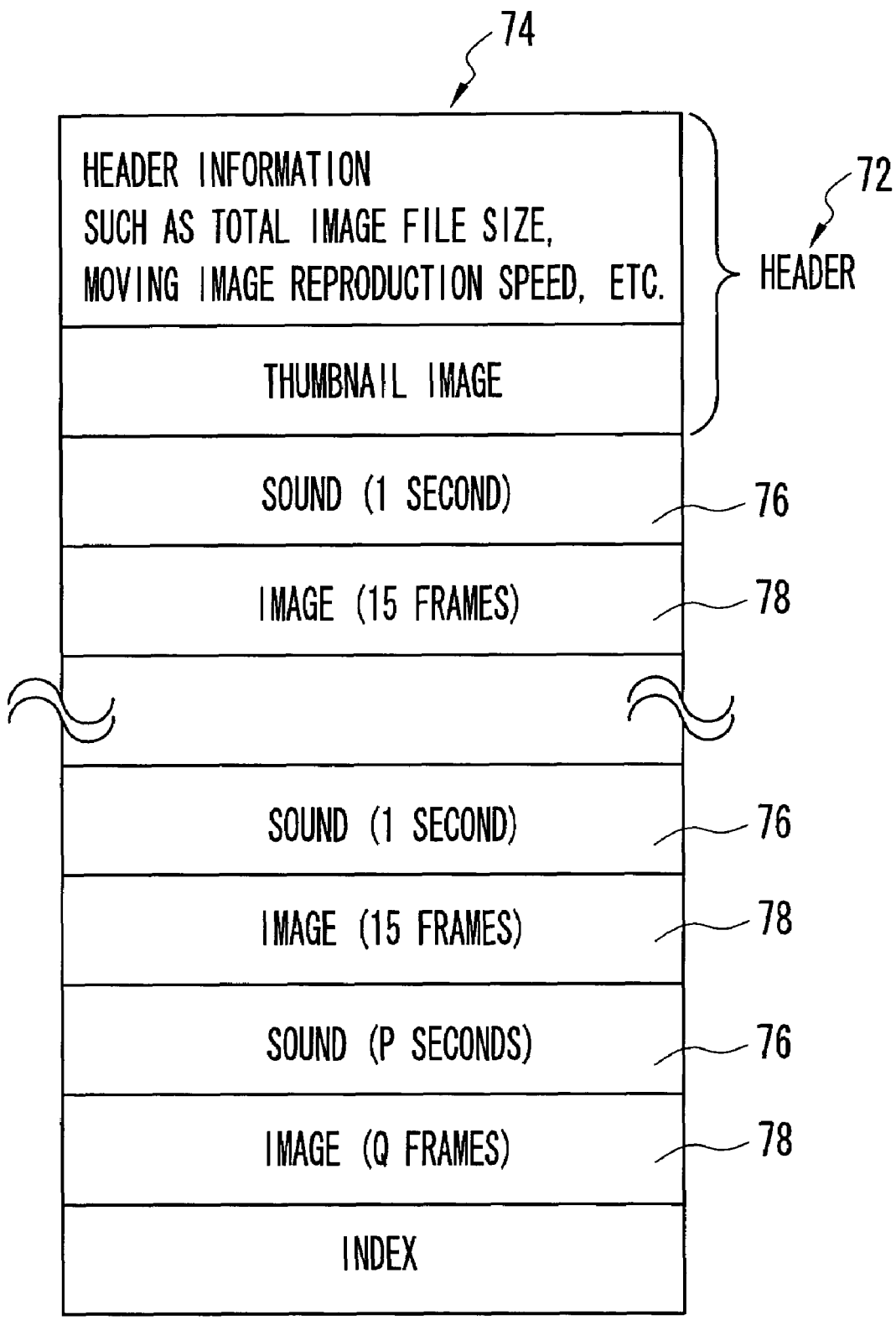
FIG. 4 is an explanatory view showing an example of data formation of a moving image file.

Then, a moving image file 74 (refer to FIG. 4) is newly created in the recording medium 44 in a step S110. The moving image file 74 is in an Audio Video Interleaving (AVI) format in this embodiment, but it may be in another format such as a Moving Picture Experts Group (MPEG) format, for example. The CPU 42 commands the memory controller 32 to read moving image data from the internal memory 34 in a step S112, and commands the recording medium controller 68 to write moving image data into the recording medium 44. The memory controller 32 reads moving image data block-by-block, in order of sound header data, sound data, image header data, and image data, and sends it to the recording medium controller 68. The recording medium controller 68 sequentially writes moving image data into the moving image file 74 in such a manner as to follow the header 72. Accordingly, as shown in FIG. 4, a sound chunk 76 including sound data of one second, and an image chunk 78 including compressed image data of fifteen picture frames are alternatively formed in the moving image file 74. Sound header data and image header data is recorded at the front-end of each sound chunk 76 and each image chunk 78, respectively. In this embodiment, the moving image of one second comprises images of fifteen picture frames. One sound chunk 76 and one image chunk 78 following thereof correspond with each other.

When the shutter button 40 is released, the photograph process stops. The recording process, however, continues until whole data in the sound area 52, the compressed image area 60, and the header area 64 of the internal memory 34 is recorded on the recording medium 44.

Upon completing the record of whole moving image data, evacuated data is reconstructed in a step S116. The memory controller 32 reads evacuated data from the evacuated data area 70 of the internal memory 34, and the recording medium controller 68 writes it into the recording medium 44. When whole data has been reconstructed, whole data in the evacuated data area 70 is deleted in a step S118. Then, the recording process ends (step S120).

If there is no existing data in the recording medium 44 in a step S104, the data evacuation process (step S106), the data reconstruction process (step S116), and the data deletion process (step S118) are not carried out.

In a case where the recording medium 44 is formatted with the high-speed record format, not with the general-purpose record format, in the step S102, the steps from S104 to S108 and from S116 to S118 are skipped. In this case, the photograph process and the recording process are carried out in the same manner as a conventional moving image recording apparatus.

In this embodiment, the steps S100 to S108 are carried out, after the shutter button 40 is depressed. These steps, however, may be carried out before the push of the shutter button 40, for example, when the digital camera 10 switches to a moving image photography mode in response to the operation of a mode switch 14.

In this embodiment, the moving image recording apparatus according to the present invention is installed in the digital camera. The moving image recording apparatus, however, is applicable to an information processor such as a printer, a PC and the like. In this case, moving image data is recorded on a recording medium, such as a memory card, a PC card, a mini floppy and the like. The recording medium is set in the printer or the PC, to read moving image data therefrom. Then, moving image data is recorded on another recording medium such as a compact disk, a DVD and the like. In this case, the moving image recording apparatus detects the type of record format of the compact disk or the DVD, and the presence or absence of existing data. If necessary, the moving image recording apparatus reformats the compact disk or the DVD, and evacuates and reconstructs existing data.

The moving image recording apparatus according to the present invention is applicable to a camera-equipped PC. In this case, moving image data photographed by the camera is recorded on a recording medium such as a compact disk and a DVD.

Although the present invention has been described with respect to the preferred embodiment, the preset invention is not to be limited to the above embodiment but, on the contrary, various modifications will be possible to those skilled in the art without departing from the scope of claims appended hereto.

What is claimed is:

1. A moving image recording apparatus for recording moving image data on a recording medium, said moving image recording apparatus comprising:
    a judgment device for judging whether a record format of said recording medium is suitable for recording said moving image data;
    a recording medium controller for controlling operation of said recording medium, said recording medium controller reformatting said recording medium with a high-speed record format suitable for the record of said moving image data when said judgment device judges that said record format is unsuitable for recording said moving image data.

2. A moving image recording apparatus as recited in claim 1, wherein said recording medium controller detects the presence or absence of existing data in said recording medium when said record format is unsuitable for recording said moving image data.

3. A moving image recording apparatus as recited in claim 2, further comprising:
    an internal memory for temporarily storing said existing data; and
    an internal memory controller for recording said existing data recorded on said recording medium onto said internal memory when said record format is unsuitable for recording said moving image data.

4. A moving image recording apparatus as recited in claim 3, wherein said recording medium controller records said existing data recorded on said internal memory onto said reformatted recording medium.

5. The moving image recording apparatus as recited in claim 1, wherein suitability of said recording medium is determined based on the cluster size of the recording medium.

6. The moving image recording apparatus as recited in claim 5, wherein a high-speed record format corresponds to a record format with a cluster size large enough to enable the recording medium to record the moving image data at a speed fast enough such that photography of the moving image data can be performed substantially continuously.

7. The moving image recording apparatus as recited in claim 5, wherein an unsuitable record format for recording said moving image data corresponds to a record format with a cluster size which is insufficient to enable the recording medium to record the moving image data at a speed fast enough such that photography of the moving image data can be performed substantially continuously.

8. The moving image recording apparatus as recited in claim 1, wherein said judgment device judges the suitability of the record format of said recording medium before photography or during photography of the moving image data.

9. The moving image recording apparatus as recited in claim 8, wherein said judgment device judges the suitability of the record format of said recording medium upon a depression of a shutter button initiating photography of the moving image data.

10. The moving image recording apparatus as recited in claim 8, wherein said judgment device judges the suitability of the record format of said recording medium upon a switching of the moving image recording apparatus to a moving image photography mode.

11. A method for recording moving image data on a recording medium, said method comprising the steps of:
    (a) detecting a record format of said recording medium;
    (b) judging whether said record format of said recording medium is suitable for recording said moving image data; and
    (c) reformatting said recording medium with a high-speed record format suitable for recording said moving image data when said record format is judged to be unsuitable for recording said moving image data.

12. A method as recited in claim 11, further comprising the steps of:
    (d) detecting the presence or absence of existing data recorded on said recording medium, when said record format is judged to be unsuitable for recording said moving image data;
    (e) temporarily evacuating said existing data to an internal memory when said existing data is in said recording medium; and
    (f) reconstructing said existing data evacuated to said internal memory in said reformatted recording medium.

13. The method for recording moving image data as recited in claim 11, wherein the judging step further comprises determining the suitability of the recording medium based on the cluster size of the recording medium.

14. The method for recording moving image data as recited in claim 13, wherein a high-speed record format corresponds to a record format with a cluster size large enough to enable the recording medium to record the moving image data at a speed fast enough such that photography of the moving image data can be performed substantially continuously.

15. The method for recording moving image data as recited in claim 13, wherein an unsuitable record format for recording said moving image data corresponds to a record format with a cluster size which is insufficient to enable the recording medium to record the moving image data at a speed fast enough such that photography of the moving image data can be performed substantially continuously.

16. The method for recording moving image data as recited in claim 11, wherein said judging step is performed before photography or during photography of the moving image data.

17. The method for recording moving image data as recited in claim 16, wherein said judging step is performed upon a depression of a shutter button initiating photography of the moving image data.

18. The method for recording moving image data as recited in claim 16, wherein said judging step is performed upon a switching of the moving image recording apparatus to a moving image photography mode.

19. An information processing device for recording moving image data on a recording medium, said information processor comprising:
    a judgment device for judging whether a record format of said recording medium is suitable for recording said moving image data;
    a recording medium controller for controlling operation of said recording medium, said recording medium controller reformatting said recording medium with a high-speed record format suitable for recording said moving image data when said judgment device judges that said record format is unsuitable for recording said moving image data.

20. An information processing device as recited in claim 19, wherein said recording medium controller detects the presence or absence of existing data in said recording medium when said record format is unsuitable for recording said moving image data.

21. An information processing device as recited in claim 20, further comprising:
- an internal memory for temporarily storing said existing data; and
- an internal memory controller for recording said existing data recorded on said recording medium onto said internal memory when said record format is unsuitable for recording said moving image data.

22. An information processing device as recited in claim 21, wherein said recording medium controller records said existing data recorded on said internal memory onto said reformatted recording medium.

23. The information processing device as recited in claim 19, wherein suitability of said recording medium is determined based on the cluster size of the recording medium.

24. The information processing device as recited in claim 23, wherein a high-speed record format corresponds to a record format with a cluster size large enough to enable the recording medium to record the moving image data at a speed fast enough such that photography of the moving image data can be performed substantially continuously.

25. The information processing device as recited in claim 23, wherein an unsuitable record format for recording said moving image data corresponds to a record format with a cluster size which is insufficient to enable the recording medium to record the moving image data at a speed fast enough such that photography of the moving image data can be performed substantially continuously.

26. The information processing device as recited in claim 19, wherein said judgment device judges the suitability of the record format of said recording medium before photography or during photography of the moving image data.

27. The information processing device as recited in claim 26, wherein said judgment device judges the suitability of the record format of said recording medium upon a depression of a shutter button initiating photography of the moving image data.

28. The information processing device as recited in claim 26, wherein said judgment device judges the suitability of the record format of said recording medium upon a switching of the moving image recording apparatus to a moving image photography mode.

* * * * *